US010677966B1

(12) United States Patent
Ouderkirk et al.

(10) Patent No.: US 10,677,966 B1
(45) Date of Patent: Jun. 9, 2020

(54) FLEXIBLE BORDER ALLOWING HINGE ROTATION OF MEMBRANE FOR FLUID-FILLED LENS

(71) Applicant: Facebook Technologies, LLC, Menlo Park, CA (US)

(72) Inventors: Andrew John Ouderkirk, Redmond, WA (US); Lu Lu, Kirkland, WA (US)

(73) Assignee: Facebook Technologies, LLC, Menlo Park, CA (US)

(*) Notice: Subject to any disclaimer, the term of this patent is extended or adjusted under 35 U.S.C. 154(b) by 194 days.

(21) Appl. No.: 15/877,254

(22) Filed: Jan. 22, 2018

(51) Int. Cl.
  *G02B 3/14* (2006.01)
  *G02B 27/00* (2006.01)
  *G02B 3/00* (2006.01)

(52) U.S. Cl.
  CPC .......... *G02B 3/14* (2013.01); *G02B 27/0025* (2013.01); *G02B 3/0081* (2013.01); *G02B 2003/0093* (2013.01)

(58) Field of Classification Search
  CPC .............. G02B 13/143; G02B 26/005; G02B 26/0816; G02B 26/0825; G02B 13/0075; G02B 13/009; G02B 3/14; G02B 26/02; G03F 7/70958; G03F 7/20; Y10S 359/90
  See application file for complete search history.

(56) References Cited

U.S. PATENT DOCUMENTS

| | | | |
|---|---|---|---|
| 2,836,101 A | 5/1958 | Swart | |
| 4,261,655 A * | 4/1981 | Honigsbaum | G02B 3/12 351/159.41 |
| 6,618,208 B1 | 9/2003 | Silver | |
| 7,085,065 B2 | 8/2006 | Silver | |
| 7,142,369 B2 | 11/2006 | Wu et al. | |
| 7,369,321 B1 | 5/2008 | Ren et al. | |
| 8,526,113 B2 | 9/2013 | Pugh et al. | |
| 8,817,381 B2 | 8/2014 | Gupta et al. | |
| 2006/0164731 A1 * | 7/2006 | Wu | G02B 3/14 359/666 |
| 2008/0117521 A1 * | 5/2008 | Krupenkin | G02B 3/14 359/665 |
| 2008/0316610 A1 * | 12/2008 | Dobrusskin | G02B 3/14 359/666 |
| 2010/0182703 A1 * | 7/2010 | Bolis | G02B 3/14 359/666 |

(Continued)

FOREIGN PATENT DOCUMENTS

WO    2008063442 A1    5/2018

OTHER PUBLICATIONS

"Ion Implantation", retrieved from https://matenggroup.wordpress.com/ion-implantation/ and printed on Nov. 6, 2018.

(Continued)

*Primary Examiner* — William R Alexander
*Assistant Examiner* — Balram T Parbadia
(74) *Attorney, Agent, or Firm* — Kilpatrick Townsend & Stockton LLP

(57) ABSTRACT

A liquid lens for providing a variable focal length is described. A flexible border for the liquid lens serves as a transition to facilitate rotational movement at an edge of a membrane that is part of the liquid lens, thereby reducing distortion caused by the "beam effect" of the membrane securely attached to an anchor point.

20 Claims, 10 Drawing Sheets

(56) References Cited

U.S. PATENT DOCUMENTS

| | | | | |
|---|---|---|---|---|
| 2010/0195213 A1* | 8/2010 | Bolis | .................... | G02B 26/004 |
| | | | | 359/666 |
| 2011/0032624 A1* | 2/2011 | Bolis | .................... | B81B 3/0021 |
| | | | | 359/666 |
| 2011/0085131 A1* | 4/2011 | Gupta | ..................... | G02B 3/14 |
| | | | | 351/159.6 |
| 2012/0041553 A1* | 2/2012 | Gupta | ..................... | G02B 3/14 |
| | | | | 623/6.13 |
| 2012/0170134 A1* | 7/2012 | Bolis | ................. | G02B 26/0825 |
| | | | | 359/666 |
| 2012/0170920 A1* | 7/2012 | Moreau | .................... | G02B 3/14 |
| | | | | 396/72 |
| 2017/0184848 A1* | 6/2017 | Vallius | ..................... | G02B 3/14 |

OTHER PUBLICATIONS

"Inkjet printing", retrieved from https://en.wikipedia.org/wiki/Inkjet_printing and printed on Nov. 6, 2018.

Stevens et al., "A review of adjustable lenses for head mounted displays", SPIE Symposium, Sep. 12, 2017, 20 pages.

Hasan et al., "Tunable-focus lens for adaptive eyeglasses", Optics Express vol. 25, No. 2, Jan. 23, 2017, 13 pages.

* cited by examiner

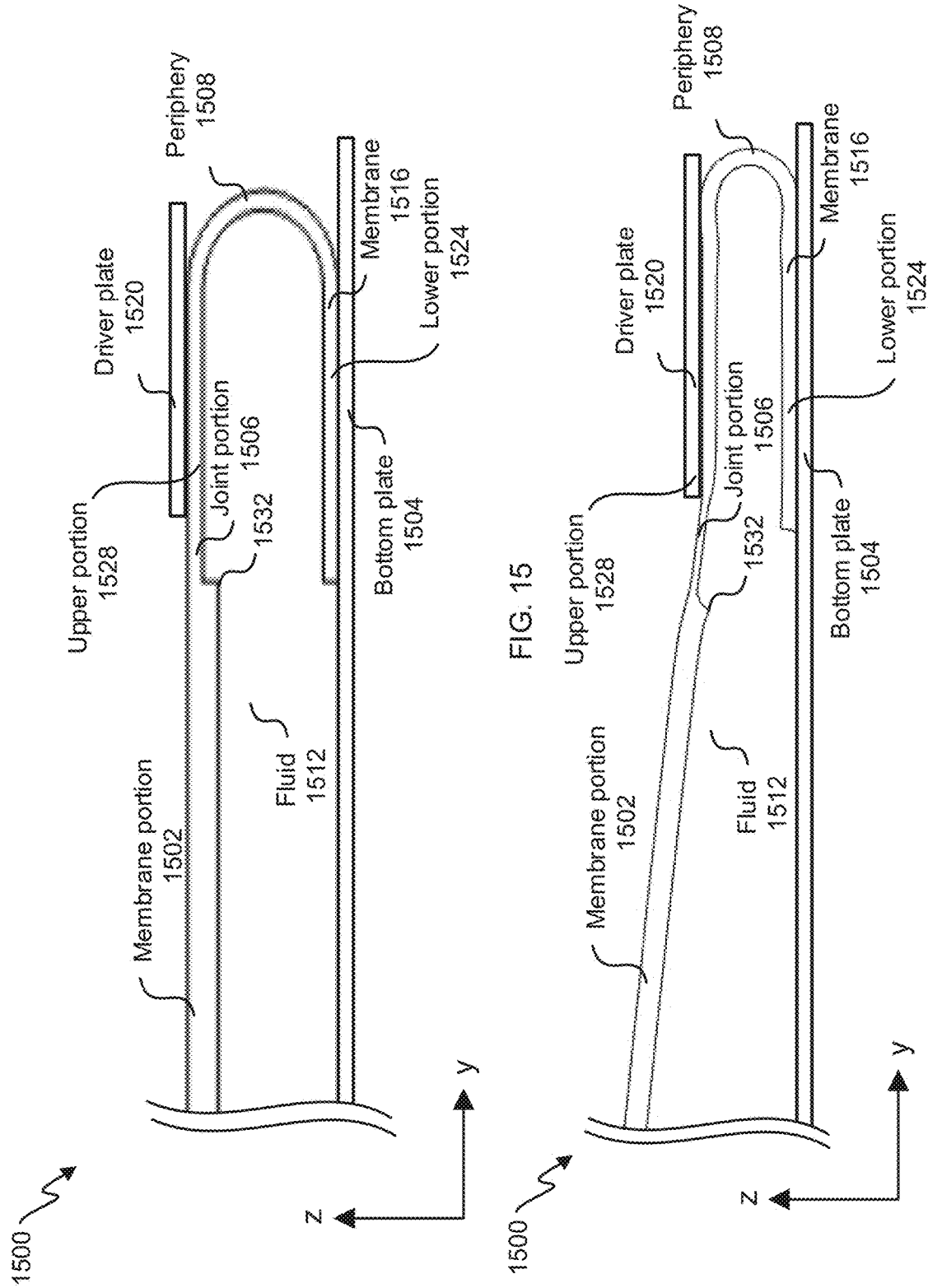

FLEXIBLE BORDER ALLOWING HINGE ROTATION OF MEMBRANE FOR FLUID-FILLED LENS

BACKGROUND

This disclosure relates generally to near-eye-display systems, and more specifically to waveguide displays with a small form factor, a large field of view, and/or a large eyebox. Near-eye, light-field displays project images directly into a user's eye, encompassing both near-eye displays and electronic viewfinders. Conventional near-eye displays generally have a display element that generates image light that passes through one or more lenses before reaching a user's eyes. Additionally, near-eye displays in virtual-reality (VR) systems and/or augmented-reality (AR) systems have design criteria to be compact, be lightweight, and provide two-dimensional expansion with a large eyebox and a wide field-of-view (FOV). In typical near-eye displays, a limit for the FOV is based on satisfying two physical conditions: (1) an occurrence of total internal reflection of image light coupled into a waveguide, and (2) an existence of a first-order diffraction caused by a diffraction grating. Conventional methods used to satisfy the above two physical conditions rely on heavy and expensive components. Further, designing a conventional near-eye display with two-dimensional expansion involving two different output-grating elements that are spatially separated often results in a large form factor. Accordingly, it is challenging to design near-eye displays using conventional methods to achieve a small form factor, a large FOV, and/or a large eyebox.

SUMMARY

The present disclosure relates generally to liquid lenses for variable focus length. A flexible border for a liquid lens serves as a transition to allow movement at an edge of a membrane that is part of the liquid lens, thereby reducing distortion caused by the "beam effect" of the membrane securely attached to an anchor point.

In some embodiments, a device for use as a liquid lens in an augmented-reality system comprises a substrate; a membrane portion, wherein the membrane portion is flexible; a fluid filling a gap between the substrate and the membrane portion; a periphery confining the fluid within a shape of the periphery; and a joint portion, wherein: the joint portion couples the membrane portion with the periphery, and the joint portion is configured to allow the membrane portion to move in relation to the periphery to a greater degree than the membrane portion is flexible and/or the joint portion is configured to facilitate rotational movement of the membrane portion about the periphery as the liquid lens changes shape. In some embodiments, the membrane portion has an average thickness; the joint portion has an average thickness; the average thickness of the joint portion is between 20% and 80% of the average thickness of the membrane portion; the joint portion follows the shape of the periphery; the joint portion has varying thickness as a function of position along the shape of the periphery; the membrane portion has a shape in a plane orthogonal to beam propagation that is non-elliptical; the joint portion is defined by a width, a length, and/or a thickness; the width is a distance between the periphery and the membrane portion; the length follows the shape of the periphery; the thickness is a minimum distance between a first side of the joint portion and a second side of the joint portion; the width of the joint portion is a constant; the shape of the periphery includes an edge and a corner; the edge of the periphery is defined by a first radius of curvature; the corner of the periphery is defined by a second radius of curvature; the first radius of curvature is at least four times the second radius of curvature; a first thickness of the joint portion at the edge is less than a second thickness of the joint portion at the corner; the first thickness is between 10% and 60% of the second thickness; and/or the joint portion is made of a different material than the membrane portion.

In some embodiments, a method of using a liquid lens in an augmented-reality system comprises applying pressure to a membrane portion of the liquid lens in relation to a periphery of the liquid lens; pivoting the membrane portion in relation to the periphery using a joint portion; and/or transmitting light through the liquid lens after pivoting the membrane portion, whereby beam effect is reduced compared to a liquid lens without a joint portion. In some embodiments, the liquid lens comprises a substrate; the membrane portion; a fluid filling a gap between the substrate and the membrane portion; the periphery confining the fluid within a shape of the periphery; and/or a joint portion, wherein: the joint portion couples the membrane portion with the periphery, and/or the joint portion is configured to allow the membrane portion to move in relation to the periphery. In some embodiments the membrane portion has an average thickness; the joint portion has an average thickness; the average thickness of the joint portion is between 20% and 80% of the average thickness of the membrane portion; the shape of the periphery is non-elliptical; the membrane portion pivots less near a corner of the periphery than at an edge of the periphery because a thickness of the joint portion at the corner is greater than a thickness of the joint portion at the edge; the method further comprises thinning a membrane to form the joint portion; and/or thinning a first side of the membrane and thinning a second side of the membrane to form the joint portion.

In some embodiments, a system for augmented reality comprises a frame; a display mounted in the frame; a waveguide in the display; and/or a liquid lens configured to change focus of light exiting the waveguide, the liquid lens comprising: a substrate; a membrane portion, wherein the membrane portion is flexible; a fluid filling a gap between the substrate and the membrane portion; a periphery confining the fluid within a shape of the periphery; and/or a joint portion, wherein: the joint portion couples the membrane portion with the periphery, and/or the joint portion is configured to allow the membrane portion to move in relation to the periphery to a greater degree than the membrane portion is flexible. In some embodiments, the liquid lens is a first liquid lens, the system further comprises a second liquid lens, and/or the second liquid lens is configured to counteract effects of the first liquid lens for an object imaged on an opposite side of the display in relation to a user's eye.

BRIEF DESCRIPTION OF THE DRAWINGS

Illustrative embodiments are described with reference to the following figures.

FIG. 15 illustrates a cross section of another embodiment of a jointed lens.

FIG. 16 illustrates the jointed lens in FIG. 15 with a compressed periphery.

Figure 1:
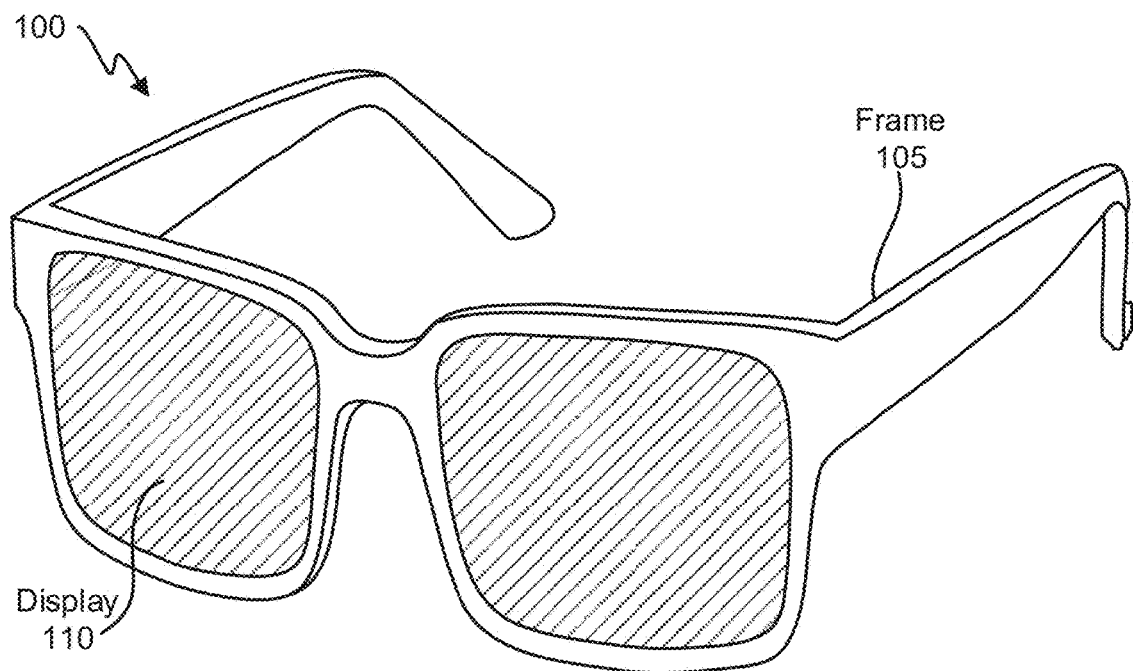
FIG. 1 is a diagram of an embodiment of a near-eye display.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive.

This disclosure relates generally liquid lenses with a variable focal length. More specifically, and without limitation, this disclosure relates to the use of a flexible border that serves as a transition to allow movement at the edge of a membrane that is part of a liquid lens, thereby reducing distortion caused by the "beam effect." A liquid lens refers to an optical element comprising a clear, flexible membrane, and containing a liquid. The "beam effect" refers to an undesirable cross-sectional s-curve of the membrane, which occurs when a curvature of the liquid lens deviates from a simple curve due to the border of the membrane being fixedly anchored to a frame and/or head-mounted display (HMD). As liquid fills the liquid lens (and/or as force is applied to increase internal pressure of the lens), the membrane deforms (changes) to effectuate a different optical power. Ideally, as the membrane deforms, it takes on the shape of a specified lens (e.g., spherical lens). For example, the cross section of such a lens may resemble a simple curve. However, because the edge of the membrane is fixedly anchored to a substrate, the HMD, or eyewear frame, the cross section of the shape may resemble an s-curve instead of a simple curve. The present disclosure introduces a flexible border between the membrane and substrate, the HMD, or eyewear frame. From a cross-sectional view, the flexible border allows the membrane to be attached to, yet be capable of rotational movement about, the anchor point on the HMD or eye wear frame. This substantially reduces or eliminates the s-curve, because the membrane is no longer anchored at a fixed angle. The "beam effect" is thus effectively diminished.

The flexible border may comprise the same material as the membrane. In some embodiments, the flexible border is formed by simply creating a notch in the membrane, close to the anchor point along the boundary of the membrane. The notch may be created on one side (e.g., external to the liquid lens) or both sides (e.g., external and internal to the liquid lens) of the membrane. Again, from a cross-sectional view, the notch relieves stresses caused by rotational motion as the membrane deforms to effectuate a different optical power. In some embodiments, the flexible border may comprise a different material than the membrane.

FIG. 1 is a diagram of an embodiment of a near-eye display 100. The near-eye display 100 presents media to a user. Examples of media presented by the near-eye display 100 include one or more images, video, and/or audio. In some embodiments, audio is presented via an external device (e.g., speakers and/or headphones) that receives audio information from the near-eye display 100, a console, or both, and presents audio data based on the audio information. The near-eye display 100 is generally configured to operate as a virtual reality (VR) display. In some embodiments, the near-eye display 100 is modified to operate as an augmented reality (AR) display and/or a mixed reality (MR) display.

The near-eye display 100 includes a frame 105 and a display 110. The frame 105 is coupled to one or more optical elements. The display 110 is configured for the user to see content presented by the near-eye display 100. In some embodiments, the display 110 comprises a waveguide display assembly for directing light from one or more images to an eye of the user.

Figure 2:
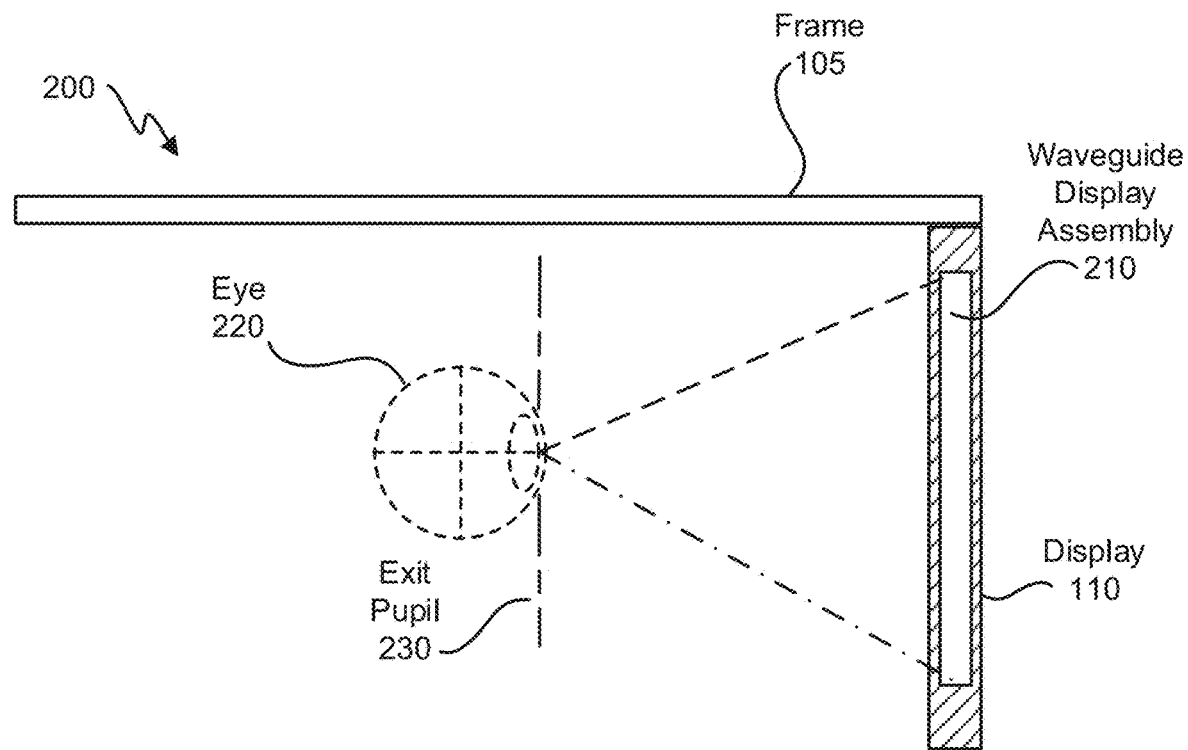
FIG. 2 is an embodiment of a cross section of the near-eye display.

FIG. 2 is an embodiment of a cross section 200 of the near-eye display 100 illustrated in FIG. 1. The display 110 includes at least one waveguide display assembly 210. An exit pupil 230 is a location where the eye 220 is positioned in an eyebox region when the user wears the near-eye display 100. For purposes of illustration, FIG. 2 shows the cross section 200 associated with a single eye 220 and a single waveguide display assembly 210, but a second waveguide display is used for a second eye of a user.

The waveguide display assembly 210 is configured to direct image light to an eyebox located at the exit pupil 230 and to the eye 220. The waveguide display assembly 210 may be composed of one or more materials (e.g., plastic, glass, etc.) with one or more refractive indices. In some embodiments, the near-eye display 100 includes one or more optical elements between the waveguide display assembly 210 and the eye 220.

In some embodiments, the waveguide display assembly 210 includes a stack of one or more waveguide displays including, but not restricted to, a stacked waveguide display, a varifocal waveguide display, etc. The stacked waveguide display is a polychromatic display (e.g., a red-green-blue (RGB) display) created by stacking waveguide displays whose respective monochromatic sources are of different colors. The stacked waveguide display is also a polychromatic display that can be projected on multiple planes (e.g. multi-planar colored display). In some configurations, the stacked waveguide display is a monochromatic display that can be projected on multiple planes (e.g. multi-planar monochromatic display). The varifocal waveguide display is a display that can adjust a focal position of image light emitted from the waveguide display. In alternate embodiments, the waveguide display assembly 210 may include the stacked waveguide display and the varifocal waveguide display.

Figure 3:
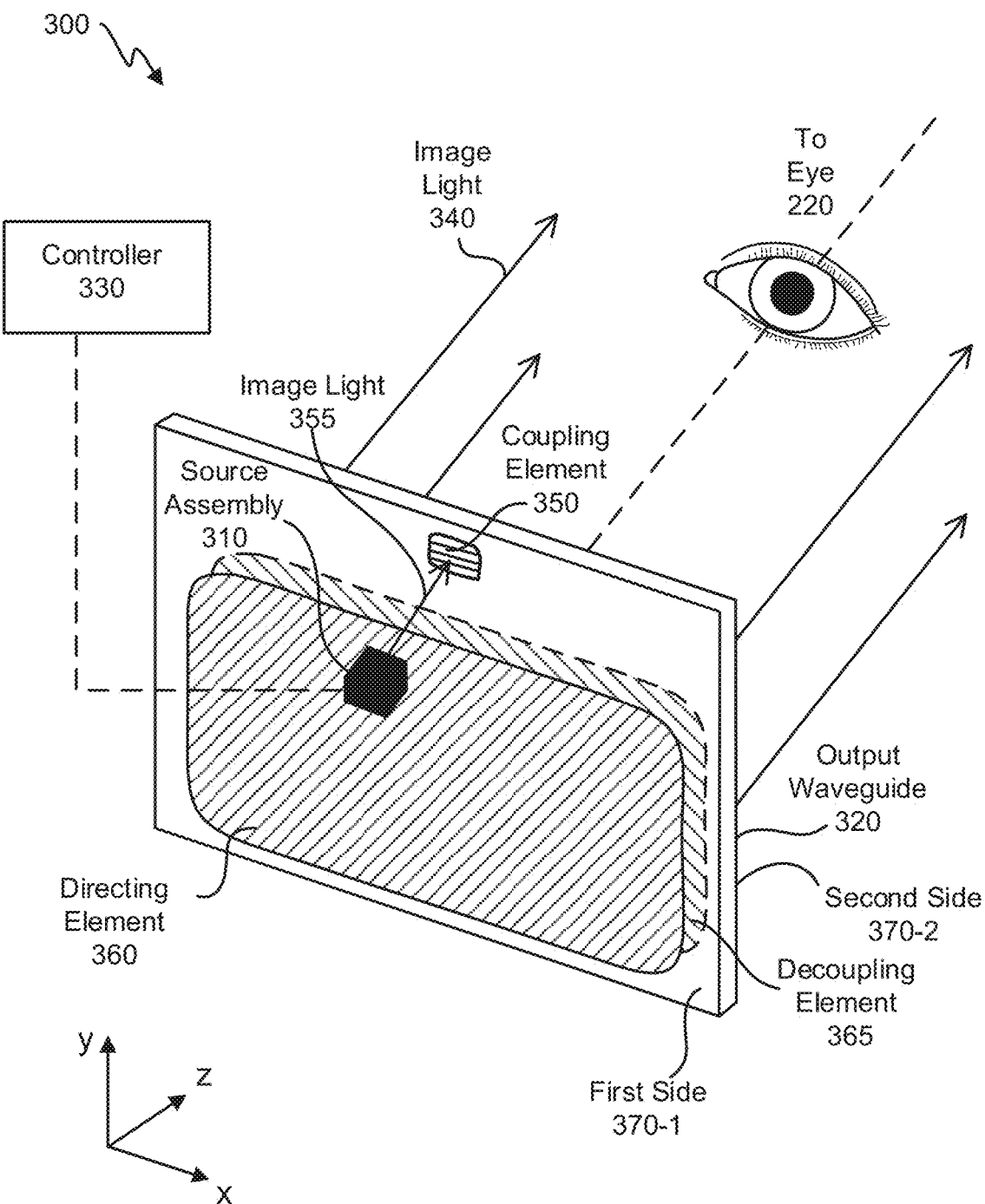
FIG. 3 illustrates an isometric view of an embodiment of a waveguide display with a single source assembly.

FIG. 3 illustrates an isometric view of an embodiment of a waveguide display 300. In some embodiments, the waveguide display 300 is a component (e.g., the waveguide display assembly 210) of the near-eye display 100. In some embodiments, the waveguide display 300 is part of some other near-eye display or other system that directs image light to a particular location.

The waveguide display 300 includes a source assembly 310, an output waveguide 320, and a controller 330. For purposes of illustration, FIG. 3 shows the waveguide display 300 associated with a single eye 220, but in some embodiments, another waveguide display separate, or partially separate, from the waveguide display 300 provides image light to another eye of the user.

The source assembly 310 generates image light 355. The source assembly 310 generates and outputs the image light 355 to a coupling element 350 located on a first side 370-1 of the output waveguide 320. The output waveguide 320 is an optical waveguide that outputs expanded image light 340 to an eye 220 of a user. The output waveguide 320 receives the image light 355 at one or more coupling elements 350 located on the first side 370-1 and guides received input image light 355 to a directing element 360. In some embodiments, the coupling element 350 couples the image light 355 from the source assembly 310 into the output waveguide 320. The coupling element 350 may be, e.g., a diffraction grating, a holographic grating, one or more cascaded reflectors, one or more prismatic surface elements, and/or an array of holographic reflectors.

The directing element 360 redirects the received input image light 355 to the decoupling element 365 such that the received input image light 355 is decoupled out of the output waveguide 320 via the decoupling element 365. The directing element 360 is part of, or affixed to, the first side 370-1 of the output waveguide 320. The decoupling element 365 is part of, or affixed to, the second side 370-2 of the output waveguide 320, such that the directing element 360 is opposed to the decoupling element 365. The directing element 360 and/or the decoupling element 365 may be, e.g., a diffraction grating, a holographic grating, one or more cascaded reflectors, one or more prismatic surface elements, and/or an array of holographic reflectors.

The second side 370-2 represents a plane along an x-dimension and a y-dimension. The output waveguide 320 may be composed of one or more materials that facilitate total internal reflection of the image light 355. The output waveguide 320 may be composed of e.g., silicon, plastic, glass, and/or polymers. The output waveguide 320 has a relatively small form factor. For example, the output waveguide 320 may be approximately 50 mm wide along x-dimension, 30 mm long along y-dimension and 0.5-1 mm thick along a z-dimension.

The controller 330 controls scanning operations of the source assembly 310. The controller 330 determines scanning instructions for the source assembly 310. In some embodiments, the output waveguide 320 outputs expanded image light 340 to the user's eye 220 with a large field of view (FOV). For example, the expanded image light 340 provided to the user's eye 220 with a diagonal FOV (in x and y) of 60 degrees and or greater and/or 150 degrees and/or less. The output waveguide 320 is configured to provide an eyebox with a length of 20 mm or greater and/or equal to or less than 50 mm, and/or a width of 10 mm or greater and/or equal to or less than 50 mm.

Figure 4:
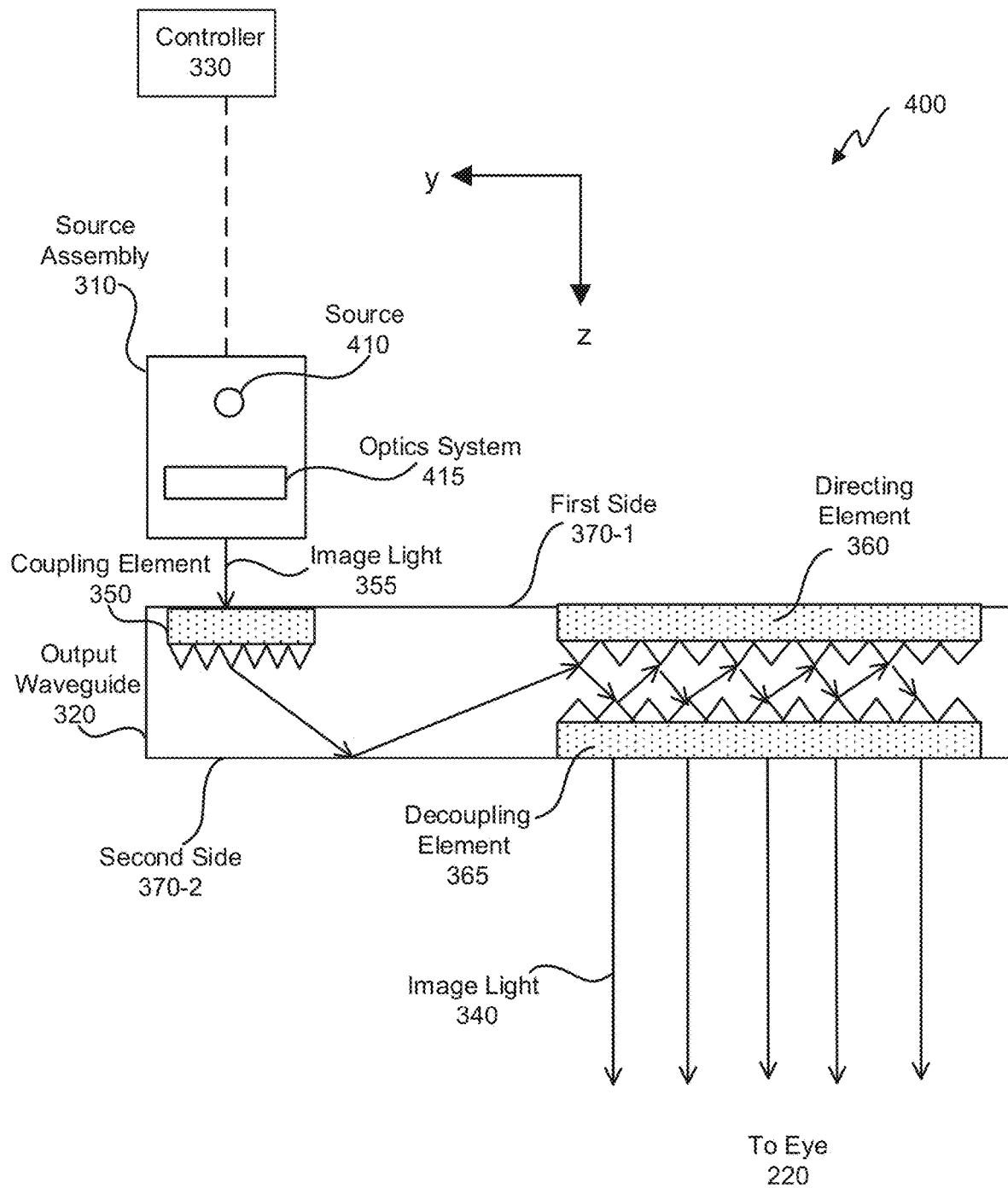
FIG. 4 illustrates a cross section of an embodiment of the waveguide display.

FIG. 4 illustrates an embodiment of a cross section 400 of the waveguide display 300. The cross section 400 includes the source assembly 310 and the output waveguide 320. The source assembly 310 generates image light 355 in accordance with scanning instructions from the controller 330. The source assembly 310 includes a source 410 and an optics system 415. The source 410 is a light source that generates coherent or partially coherent light. The source 410 may be, e.g., a laser diode, a vertical cavity surface emitting laser, and/or a light emitting diode.

The optics system 415 includes one or more optical components that condition the light from the source 410. Conditioning light from the source 410 may include, e.g., expanding, collimating, and/or adjusting orientation in accordance with instructions from the controller 330. The one or more optical components may include one or more lens, liquid lens, mirror, aperture, and/or grating. In some embodiments, the optics system 415 includes a liquid lens with a plurality of electrodes that allows scanning a beam of light with a threshold value of scanning angle to shift the beam of light to a region outside the liquid lens. Light emitted from the optics system 415 (and the source assembly 310) is referred to as image light 355.

The output waveguide 320 receives the image light 355. The coupling element 350 couples the image light 355 from the source assembly 310 into the output waveguide 320. In embodiments where the coupling element 350 is diffraction grating, a pitch of the diffraction grating is chosen such that total internal reflection occurs in the output waveguide 320, and the image light 355 propagates internally in the output waveguide 320 (e.g., by total internal reflection), toward the decoupling element 365.

The directing element 360 redirects the image light 355 toward the decoupling element 365 for decoupling from the output waveguide 320. In embodiments where the directing element 360 is a diffraction grating, the pitch of the diffraction grating is chosen to cause incident image light 355 to exit the output waveguide 320 at angle(s) of inclination relative to a surface of the decoupling element 365.

In some embodiments, the directing element 360 and/or the decoupling element 365 are structurally similar. The expanded image light 340 exiting the output waveguide 320 is expanded along one or more dimensions (e.g., may be elongated along x-dimension). In some embodiments, the waveguide display 300 includes a plurality of source assemblies 310 and a plurality of output waveguides 320. Each of the source assemblies 310 emits a monochromatic image light of a specific band of wavelength corresponding to a primary color (e.g., red, green, or blue). Each of the output waveguides 320 may be stacked together with a distance of separation to output an expanded image light 340 that is multi-colored.

Figure 5:
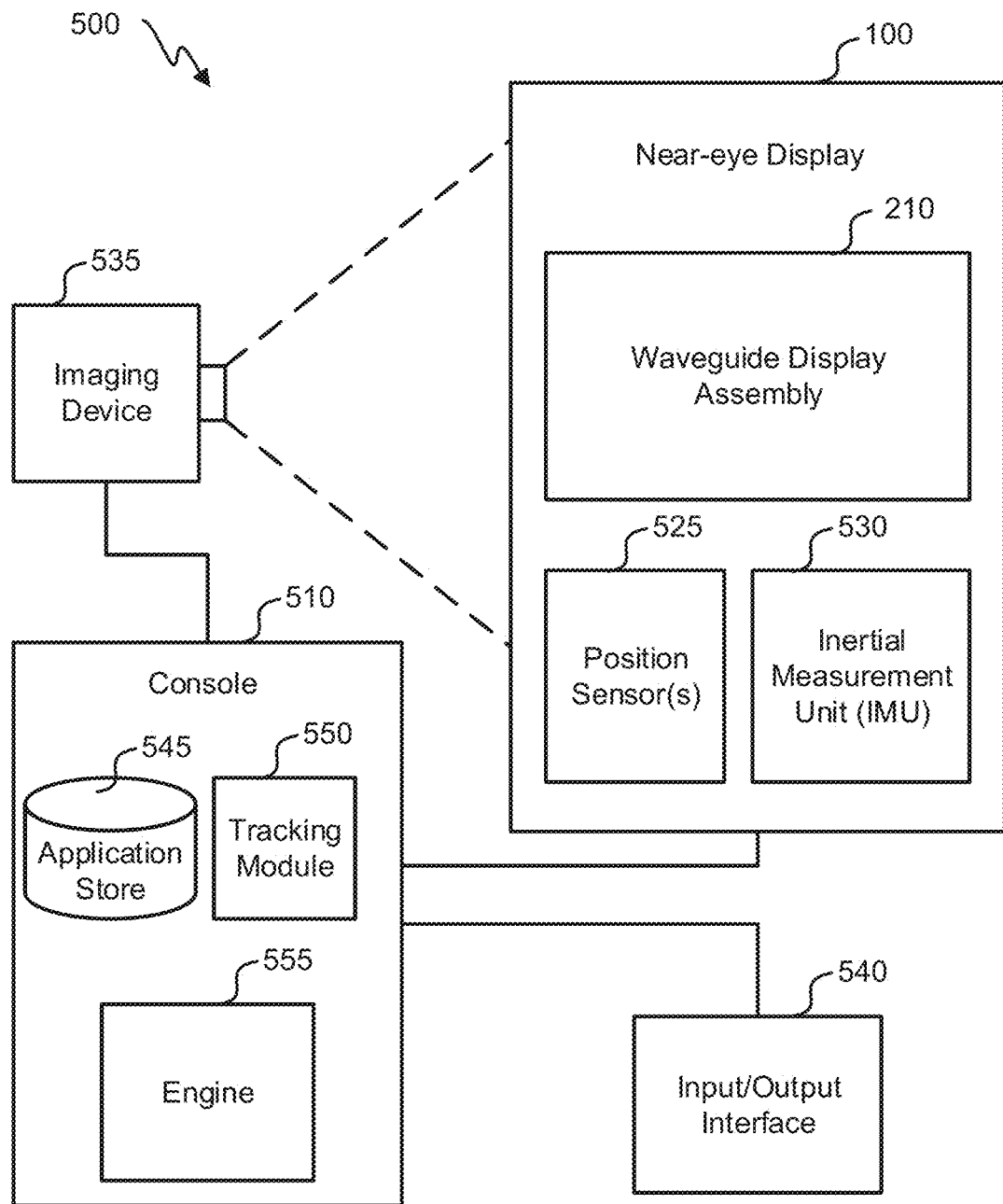
FIG. 5 is a block diagram of an embodiment of a system including the near-eye display.

FIG. 5 is a block diagram of an embodiment of a system 500 including the near-eye display 100. The system 500 comprises the near-eye display 100, an imaging device 535, and an input/output interface 540 that are each coupled to a console 510.

The near-eye display 100 is a display that presents media to a user. Examples of media presented by the near-eye display 100 include one or more images, video, and/or audio. In some embodiments, audio is presented via an external device (e.g., speakers and/or headphones) that receives audio information from the near-eye display 100 and/or the console 510 and presents audio data based on the audio information to a user. In some embodiments, the near-eye display 100 may also act as an AR eyewear glass. In some embodiments, the near-eye display 100 augments views of a physical, real-world environment, with computer-generated elements (e.g., images, video, sound, etc.).

The near-eye display 100 includes a waveguide display assembly 210, one or more position sensors 525, and/or an inertial measurement unit (IMU) 530. The waveguide display assembly 210 includes the source assembly 310, the output waveguide 320, and the controller 330.

The IMU 530 is an electronic device that generates fast calibration data indicating an estimated position of the near-eye display 100 relative to an initial position of the near-eye display 100 based on measurement signals received from one or more of the position sensors 525.

The imaging device 535 generates slow calibration data in accordance with calibration parameters received from the console 510. The imaging device 535 may include one or more cameras and/or one or more video cameras.

The input/output interface 540 is a device that allows a user to send action requests to the console 510. An action request is a request to perform a particular action. For example, an action request may be to start or end an application or to perform a particular action within the application.

The console 510 provides media to the near-eye display 100 for presentation to the user in accordance with information received from one or more of: the imaging device 535, the near-eye display 100, and the input/output interface 540. In the example shown in FIG. 5, the console 510 includes an application store 545, a tracking module 550, and an engine 555.

The application store 545 stores one or more applications for execution by the console 510. An application is a group of instructions, that when executed by a processor, generates content for presentation to the user. Examples of applications include gaming applications, conferencing applications, video playback application, or other suitable applications.

The tracking module 550 calibrates the system 500 using one or more calibration parameters and may adjust one or more calibration parameters to reduce error in determination of the position of the near-eye display 100.

The tracking module 550 tracks movements of the near-eye display 100 using slow calibration information from the imaging device 535. The tracking module 550 also determines positions of a reference point of the near-eye display 100 using position information from the fast calibration information.

The engine 555 executes applications within the system 500 and receives position information, acceleration information, velocity information, and/or predicted future positions of the near-eye display 100 from the tracking module 550. In some embodiments, information received by the engine 555 may be used for producing a signal (e.g., display instructions) to the waveguide display assembly 210 that determines a type of content presented to the user.

Figure 6:
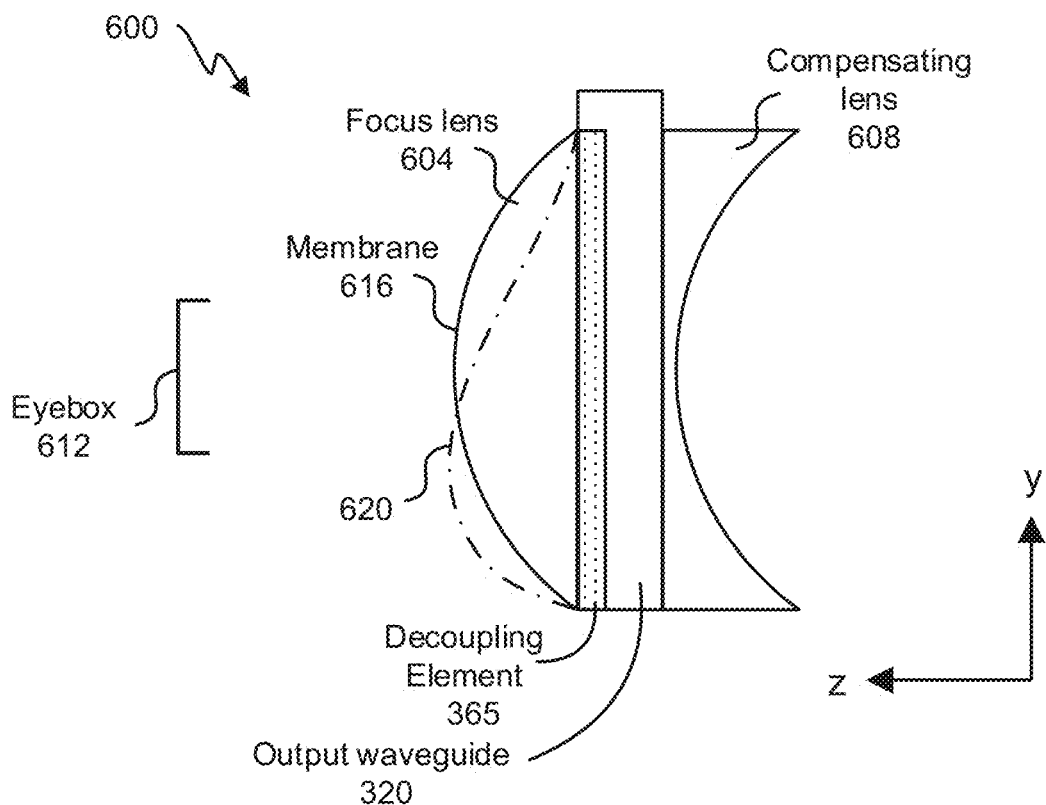
FIG. 6 illustrates a simplified diagram of an embodiment of a liquid lens system used in an augmented-reality system.

FIG. 6 illustrates a simplified diagram of an embodiment of a liquid lens used in an augmented-reality system. FIG. 6 depicts a lens system 600. The lens system 600 comprises the output waveguide 320, the decoupling element 365, a focus lens 604, and a compensating lens 608. Light is emitted from the decoupling element 365, through the focus lens 604, and to an eyebox 612. The eyebox 612 is at the exit pupil 230. The eyebox 612 is a usable area of light output from the decoupling element 365 at the exit pupil 230.

Many optical systems use refractive optical elements to change focus or to magnify an image. Optical elements usually have a fixed optical power, and there is need in many applications for a variable optical power. There are several approaches to make a lens with a variable optical power. One approach is to use a "liquid lens." A liquid lens has a membrane that is transparent and flexible. A space or gap separates the membrane from a substrate. The substrate is transparent and rigid. The space or gap is filled with a transparent fluid, commonly a silicone or organic fluid, preferably made of a material with high transmission and high refractive index. A focal length of the liquid lens is changed by moving sides of the liquid lens, by increasing or decreasing a volume of fluid in the liquid lens, and/or by increasing or decreasing pressure of fluid in the liquid lens.

In cases where the lens system 600 is mounted with its optical axis in an approximately horizontal direction, gravity can distort the lens. Distortion due to gravity and other inertial effects is proportional to $d^3/t^3$, where d is a diameter of the lens and t is a thickness of the membrane. For large lenses, particularly for lenses used to augment human vision, thicker membranes are used to reduce distortion to the lens.

In a liquid lens, edges of the membrane are usually constrained. This creates a potential compromise in performance. While thicker membranes improve the resistance of gravity and inertial effects distorting the lens, optical distortion near edges (referred to as the beam effect) also increase as $t^3$. Therefore, there is a need to reduce lens distortion due to gravity and inertial effects without creating significant optical distortion due to the beam effect from using a thicker membrane.

The focus lens 604 is a liquid lens. The compensating lens 608 is a liquid lens. The liquid lens of the focus lens 604 comprises a membrane 616. The focus lens 604 is used to change focus of light emitted from the decoupling element 365. Normally, light emitted from the decoupling element 365 is set to image at infinity (a person of skill in the art will recognize that infinity is referring to infinity focus of a lens and/or lens system). For augmented reality, light emitted from the decoupling element 365 has a change in focus to simulate three-dimensional viewing. For example, to simulate a bird landing in a user's hand, an image of the bird is projected through the output waveguide 320 and through the decoupling element 365 to the eyebox 612. The focus lens 604 is used to change the focus of the image of the bird so that the bird appears closer to the user (e.g., about 0.75 meters away from the user's eye) than at infinity.

The compensating lens 608 is used to at least partially reverse the effects of the focus lens 604 for objects beyond the lens system 600. Thus image light 340 (e.g., the bird) is focused and light from objects beyond the lens system 600 (e.g., the user's hand) is not materially changed by the lens system 600. In some embodiments, a focal length of the compensating lens 608 is changed in negative proportion to a change in focal length of the focus lens 604. In some embodiments, the compensating lens 608 is on the same side of the near-eye display 100 as the focus lens 604 (e.g., both the compensating lens 608 and the focus lens 604 are on one side of an optical substrate that provides rigid support for the near-eye display). In some embodiments, two focus lenses are used, one focus lens on each side; and one or two corrective lenses are used. In some embodiments, a corrective lens is on at least one side of the output waveguide 320.

If the membrane 616 of the focus lens 604 is too thin, and not allow sufficient tension, the membrane 616 will deform. A dashed line 620 shows an embodiment of an outline of a membrane that is deformed due to gravity. Thus a thickness or a tension, or both, of the membrane 616 is increased to reduce distortion due to gravity. However, increasing the thickness or tension, or both, of the membrane 616 can increase optical distortion, as described in conjunction with FIG. 7.

Figure 7:
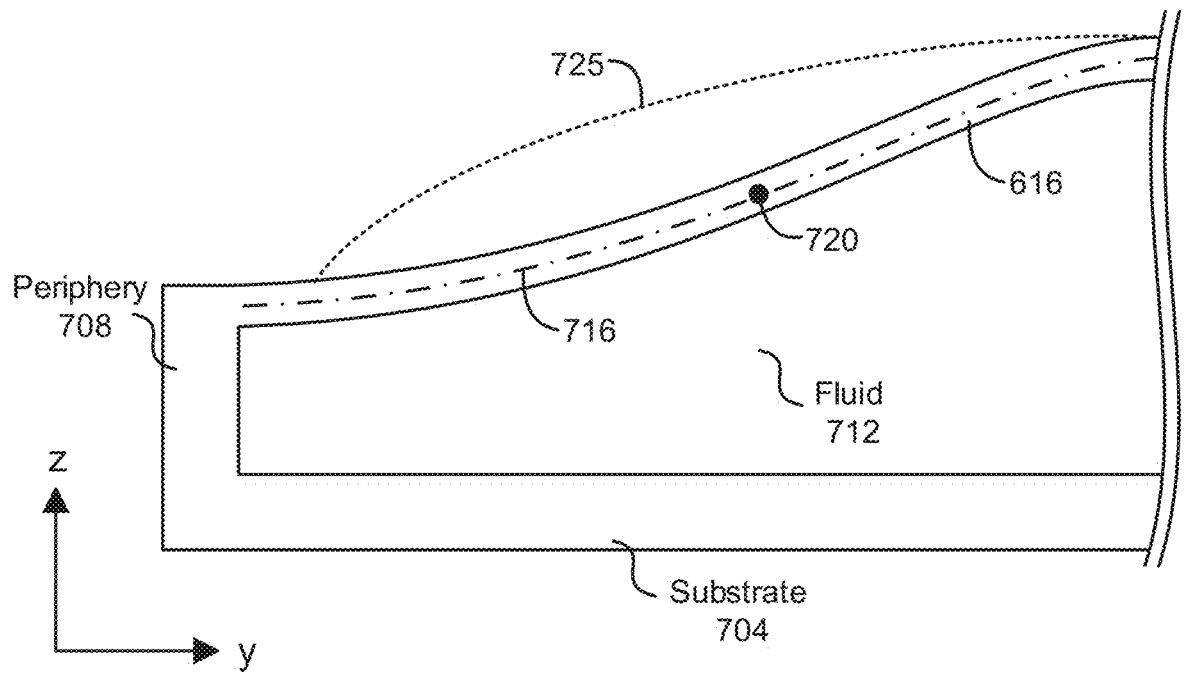
FIG. 7 illustrates a cross section of an embodiment of a liquid lens without a joint.

FIG. 7 illustrates a cross section of an embodiment of a liquid lens without a joint. FIG. 7 shows a portion of the liquid lens. The liquid lens comprises the membrane 616, a substrate 704, and a periphery 708. Fluid 712 fills a space between the substrate 704 and the membrane 616. The periphery 708 circumscribes the fluid 712 to confine the fluid 712 within a shape of the periphery 708 (e.g., the periphery 708 confines the fluid 712 within the shape, wherein the shape is defined in an x/y plane). In some embodiments, the periphery 708 is of the same material as the membrane 616 and/or the substrate 704. In some embodiments, the periphery 708 is bond material bonding the membrane 616 to the substrate 704. In some embodiments, the periphery 708 is movably coupled with the substrate 704 (e.g., so that the periphery 708 can move in the z-direction to change a focal length of the liquid lens).

The membrane 616, the substrate 704, and or the fluid 712 are transparent (e.g., allowing light to pass through so that objects behind can be distinctly seen). The substrate 704 is in an x/y plane. A direction normal to the substrate 704, the z-axis, is the optical axis. Directions along the x-axis and/or y-axis are transverse directions. The periphery 708 confines the fluid 712 in transverse directions. The substrate 704 and/or the membrane 616 confine the fluid 712 in the z-axis direction. The periphery 708 circumscribes the fluid 712 in the x/y plane.

The membrane 616 follows a first curve 716 because of being coupled to the periphery 708. The first curve 716 has an inflection point 720 where a change in a direction of curvature of membrane 616 occurs. The change in curvature of the membrane 616 causes optical distortion near the periphery 708 of the liquid lens.

By contrast, a simple curve 725 (a second curve) is shown as a dashed line. If the membrane 616 followed more closely the simple curve 725, the liquid lens would have less optical distortion near the periphery 708 of the liquid lens.

The "beam effect" refers to an undesirable cross-sectional shape of the membrane 616, which occurs when a curvature of the membrane 616 deviates from the simple curve 725 due to a border of the membrane 616 being fixedly coupled with a frame (e.g., the membrane 616 fixedly coupled to the periphery 708 following an outline of the display 110 in the frame 105). As the fluid 712 fills the liquid lens (or as force is applied to increase internal pressure of the lens), the membrane 616 deforms and the shape of the liquid lens changes to effectuate a different optical power. In some embodiments, as the membrane 616 deforms, the membrane 616 takes on a shape of a specified lens (e.g., a spherical lens). For example, a cross section of the specified lens may resemble the simple curve 725. However, because the membrane 616 is fixedly anchored to the periphery 708, the cross section of the membrane 616 is a more complex curve (e.g., the first curve 716 having an inflection point 720) instead of the simple curve 725.

Figure 8:
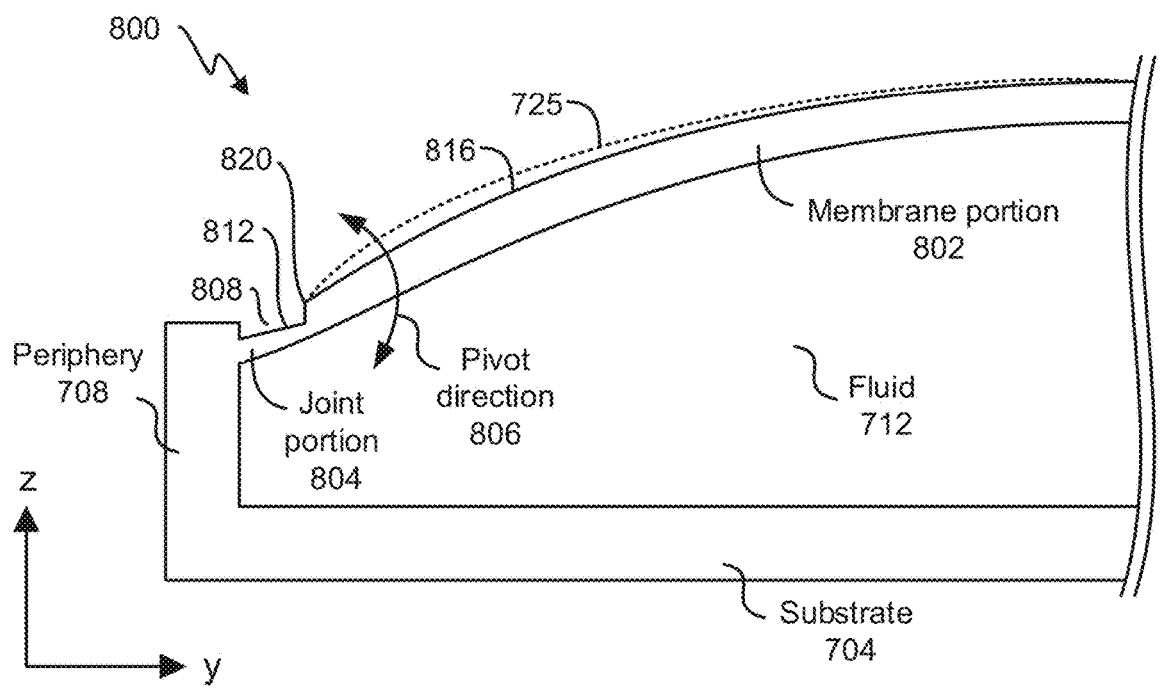
FIG. 8 illustrates a cross section of an embodiment of a jointed lens.

FIG. 8 illustrates a cross section of an embodiment of a jointed lens 800. The jointed lens 800 comprises the substrate 704, the periphery 708, the fluid 712, a membrane portion 802, and a joint portion 804. The membrane portion 802 is flexible (e.g., to change optical power as pressure of the fluid 712 is increased or decreased). The joint portion 804 allows the membrane portion 802 to pivot 806 with respect to the periphery 708 so that the membrane portion 802 makes a shape more similar to the simple curve 725. In some embodiments, the joint portion 804 is configured to allow the membrane portion 802 to move in relation to the periphery 708 to a greater degree than the membrane portion 802 being directly coupled to the periphery 708. The joint portion 804 is configured to allow the membrane portion 802 to move in relation to the periphery 708 to a greater degree than the membrane portion 802 is flexible.

In some embodiments, the joint portion 804 is made by forming a notch 808 in the membrane 616. The notch 808 reduces the beam effect by not having the membrane portion 802 fully constrained to the periphery 708. The notch 808 is defined by an upper surface 812 of the joint portion 804. The membrane portion 802 has an upper surface 816. A discontinuity 820 separates the upper surface 812 of the joint portion 804 from the upper surface 816 of the membrane portion 802. The discontinuity 820 is between the upper surface 816 of the membrane portion 802 and the periphery 708. The discontinuity 820 is a distinct change to a surface of the membrane portion 802 (e.g., in this case the distinct change is to the upper surface 816 of the membrane portion 802). In some embodiments, the upper surface 816 of the membrane portion 802 is defined by a discontinuity 820.

In some embodiments, the joint portion 804 is referred to as a flexible border. From a cross-sectional view, the flexible border allows the membrane portion 802 to be coupled with, yet be capable of rotational movement about, an anchor point (e.g., periphery 708). This substantially reduces or eliminates the optical distortion caused by the first curve 716 because the membrane portion 802 is not anchored at a fixed angle to the periphery 708. The beam effect is thus effectively diminished. In some embodiments, the first curve 716 is referenced to as an s-curve.

In some embodiments, the flexible border comprises the same material as the membrane portion 802. In some embodiments, the flexible border is formed by simply creating the notch 808 in the membrane 616 (e.g., by removing a portion of the membrane 616), close to the anchor point along the boundary of the membrane 616. The notch 808 relieves the stresses caused by rotational motion as the membrane portion 802 deforms to effectuate a different optical power. In some embodiments, the joint portion 804 facilitates rotational movement of the membrane portion 802 about the periphery 708 as the liquid lens changes shape. In some embodiments, to facilitate rotational movement means a greater degree of ease by which the membrane portion 802 rotates about the periphery 708 (e.g., greater than if the membrane were directly anchored to the periphery 708).

The membrane portion 802 is at least partially constrained at the periphery 708. The membrane portion 802 has an average thickness. The joint portion 804 has a minimum thickness. The minimum thickness of the joint portion 804 is between 20% and 80% of the average thickness of the membrane portion 802 (e.g., 20%, 40%, or 60%). The membrane portion 802 is flexible and/or elastic. In some embodiments, the membrane portion 802 is made from silicone, thermoset polyurethane, thermoplastic polyurethane (including aliphatic, aromatic, polyester, polyether, polycaprolactone polyurethanes), fluorosilane, and/or natural rubber.

In some embodiments, the joint portion 804 is defined by a width, a length, and a thickness. The width is a distance between the periphery 708 and the membrane portion 802.

The length follows a shape of the periphery 708, and the thickness is a minimum distance between a first side of the joint portion 804 and a second side of the joint portion 804. In some embodiments, the width of the joint portion 804 is between 0.2 and 2.0 mm and/or between 1.0 and 1.75 mm. In some embodiments, the width of the joint portion 804 is constant around the shape of the periphery.

Figure 9:
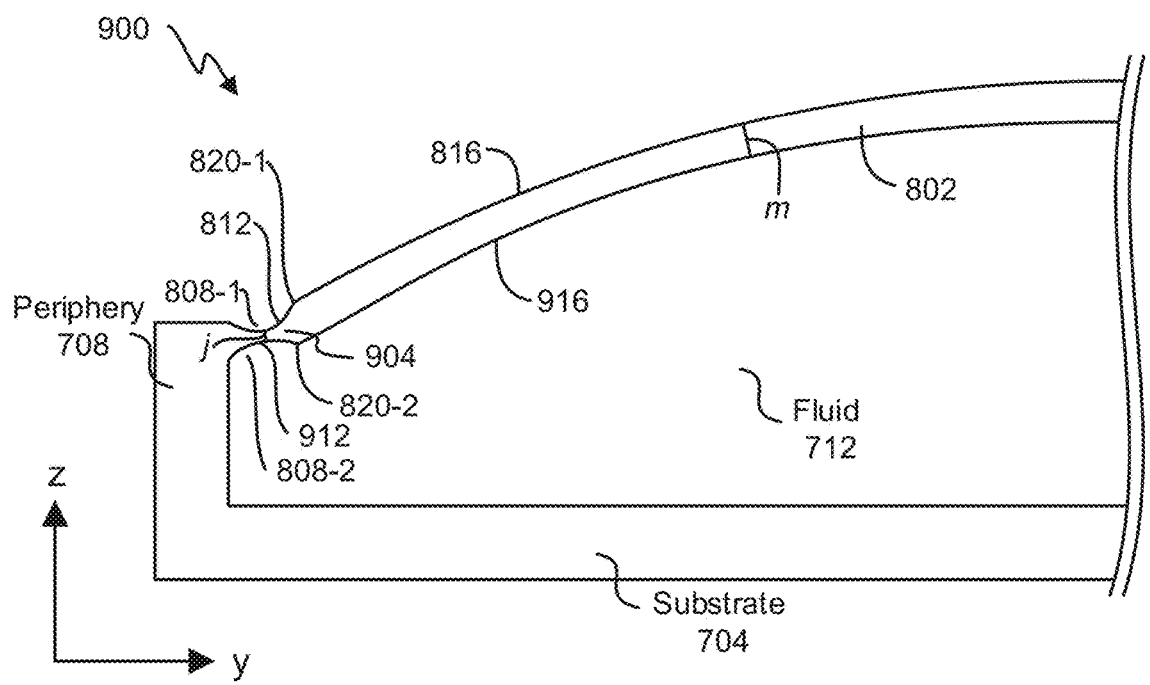
FIG. 9 illustrates a cross section of another embodiment of a jointed lens.

FIG. 9 illustrates a cross section of another embodiment of a jointed lens 900. The jointed lens 900 comprises the substrate 704, the periphery 708, the membrane portion 802, and the fluid 712 between the membrane portion 802 and the substrate 704. The jointed lens 900 comprises a joint portion 904 between the periphery 708 and the membrane portion 802. The joint portion 904 comprises an upper surface 812 defining a first notch 808-1. The upper surface 812 of the joint portion 904 is distinguished from the upper surface 816 of the membrane portion 802 by a first discontinuity 820-1.

The joint portion 904 comprises a lower surface 912. The lower surface 912 of the joint portion 904 defines a second notch 808-2. The lower surface 912 of the joint portion 904 is distinguished from a lower surface 916 of the membrane portion 802 by a second discontinuity 820-2. The second notch 808-2 is formed by removing a portion of the lower surface 916 of the membrane 616. Thus, joint portion 904 is formed by the making the first notch 808-1 in a first surface (external side) of the membrane 616 and making the second notch 808-2 in a second surface (internal side; fluid side) of the membrane 616.

The use of "lower" and "upper" are for convenience in relation to the substrate 704 for distinguishing different surfaces. The use of "lower" and "upper" are not meant to imply absolute orientation or position of the lens system 600. In some embodiments, an upper surface or lower surface is referred to as a first surface, a second surface, a third surface, etc.

In some embodiments, the joint portion 804 is connected to a middle of the membrane portion 802 (e.g., between the upper surface 816 and the lower surface 916). The joint portion 804 is connected to the middle of the membrane portion 802 to minimize distortion of the membrane portion 802 as pressure is applied to the membrane portion 802. In some embodiments, the joint portion 804 is connected to the upper surface 816 and/or the lower surface 916 to cause beneficial distortion to the membrane portion 802. For example, as the near-eye display 100 is worn by a user, gravity is in the −y direction, which can cause the membrane 616 to deform as shown by dashed line 620 in FIG. 6. To at least partially counteract deformation caused distortion due to gravity, the joint portion 804 near a top of the waveguide display 300 (e.g., top being defined in the y direction while the near-eye display 100 is worn by the user) is attached to the upper surface 816 of the membrane portion 802 and/or the joint portion 804 near a bottom of the waveguide display 300 is attached to the lower surface 916 of the membrane portion 802. In some embodiments, the joint portion 804 is attached to the lower surface 916 of the membrane portion 802 to minimize a total height of the membrane portion 802 while the membrane portion is flexed. In some embodiments, the joint portion 804 is connected to the lower surface 916 near a corner 1004 (e.g., to restrict movement); connected to the upper surface 816 near an edge 1008 (e.g., to allow greater movement); and/or connected to the middle of the membrane portion 802 between the corner 1004 and the edge 1008 (e.g., using a smooth function to transition from the upper surface 816 to the lower surface 916).

The membrane portion 802 has a thickness m. Thickness m is a distance between the upper surface 816 of the membrane portion 802 and the lower surface 916 of the membrane portion 802. In some embodiments, the thickness m is an average thickness of the membrane portion 802. The joint portion 904 has a thickness j. Thickness j is a minimum thickness of the joint portion 904 at a given cross section of the joint portion (e.g., measured from the upper surface 812 of the joint portion 904 to the lower surface 912 of the joint portion 904).

Figure 10:
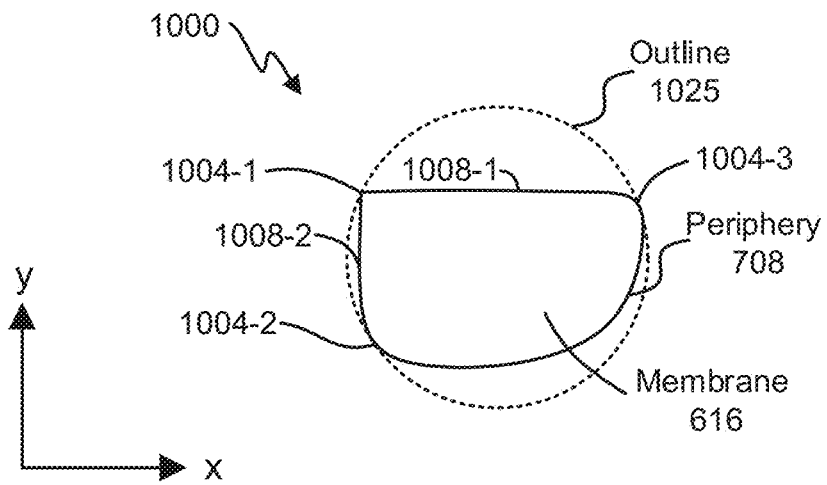
FIG. 10 is a top view of an embodiment of a non-circular lens.

FIG. 10 is a top view of an embodiment of a non-circular lens 1000. The display 110 in the frame 105 may not be circular for a variety of reasons (e.g., style). Thus the periphery 708, in some embodiments, is non-circular and/or non-elliptical in the x/y plane. However, spherical lenses provide better focusing than other lens shapes. To provide a closer approximation to a spherical lens using a non-circular periphery 708, the joint portion 804 has varying flexibility (e.g., less flexibility, more constraint, in corners; and/more flexibility, less constraint on edges). The varying flexibility allows more liftoff near edges and less near corners.

FIG. 10 shows the periphery 708 in a shape in the x/y plane. The x/y plane is orthogonal to a direction of beam propagation (beam propagation is along the z-axis). The shape is of a non-circular and/or non-elliptical lens. The shape comprises corners 1004 and edges 1008. A first corner 1004-1, a second corner 1004-2, a third corner 1004-3, a first edge 1008-1, and a second edge 1008-2 are identified. In some embodiments, the corners 1004 are curved. In some embodiments, the periphery 708 is in a shape of the display 110. In some embodiments, the corner 1004 has a first radius of curvature r1 and the edge 1008 has a second radius of curvature r2. In some embodiments, r2>4*r1; and/or r2>10*r1. In some embodiments, r2 is infinite (corresponding to a portion of the edge 1008 that is straight). In some embodiments, the joint portion 804 follows the shape of the periphery 708.

An outline 1025 of a circle is shown. The outline 1025 of the circle touches the first corner 1004-1, the second corner 1004-2, and the third corner 1004-3. The outline 1025 does not touch the first edge 1008-1 or the second edge 1008-2. For the membrane portion 802 to mimic a spherical lens, the membrane portion 802 has a peak (most movement in the z direction) near a center of the outline 1025 and the least movement at the outline 1025 of the circle. Thus the membrane portion 802 is more constrained at the corners 1004 and less constrained at the edges 1008. To provide more constraint at the corners 1004, the thickness j of the joint portion 804 is thicker near the corners. The joint portion 804 has varying thickness j as a function of position along the shape of the periphery 708.

Figure 11:
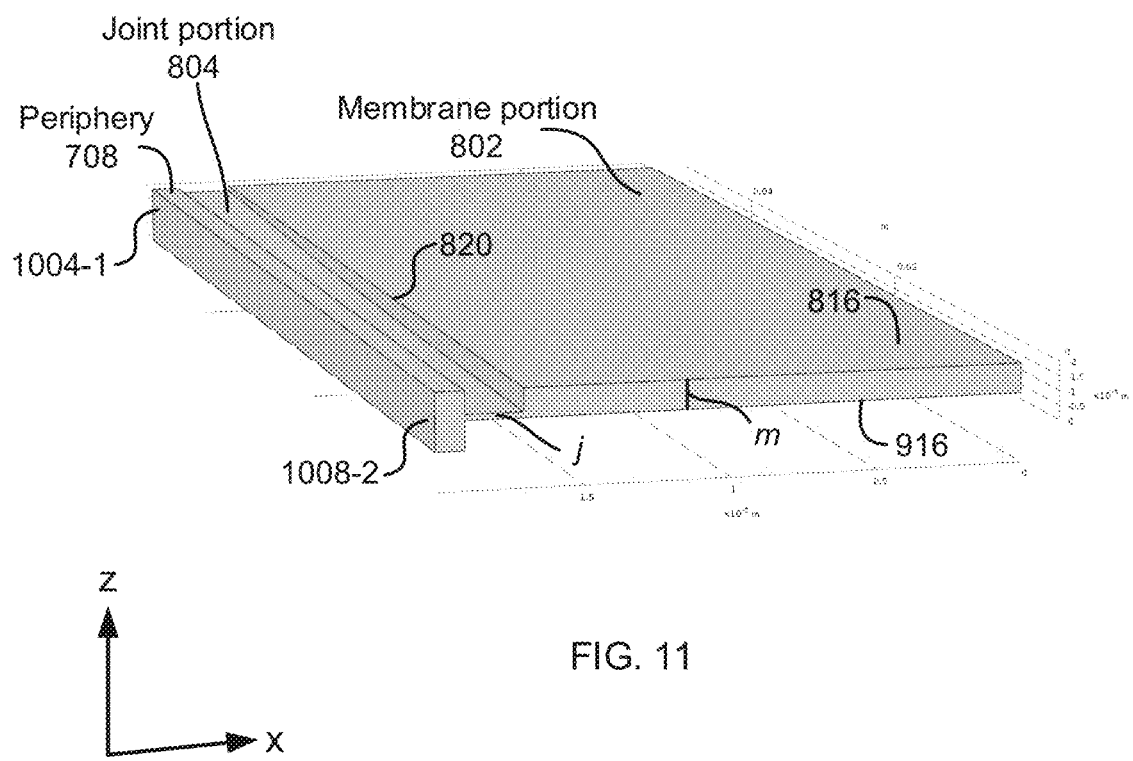
FIG. 11 is an isometric view of an embodiment of a liquid lens with a joint, wherein the joint is not flexed.

FIG. 11 is an isometric view of a portion of an embodiment of a liquid lens having a joint portion 804, wherein the joint portion 804 is not flexed. The thickness j of the joint portion 804 varies. In some embodiments, the thickness j has a variation of at least 20% (e.g., 30%, 40%). In some embodiments, thickness j at the edge 1008 is between 20% and 80% or 20% and 40% of thickness j at the corner 1004. In some embodiments, a first thickness j1 of the joint portion 804 at the edge 1008 is less than a second thickness j2 of the joint portion 804 at the corner 1004. The first thickness j1 is between 10% and 60% of the second thickness j2.

Figure 12:
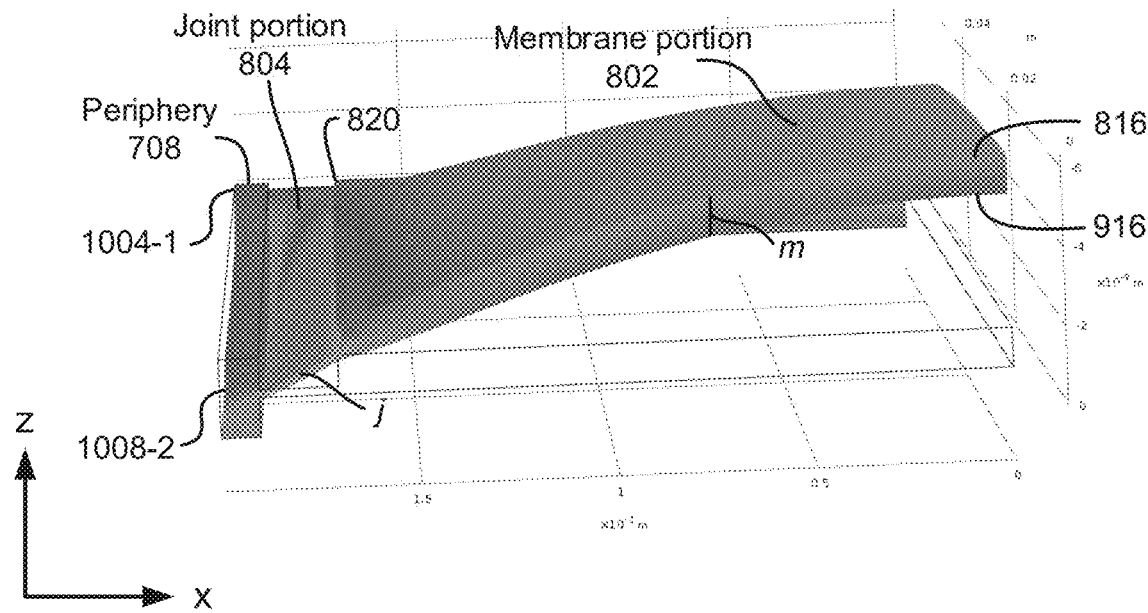
FIG. 12 is an isometric view of an embodiment of a liquid lens with a joint, wherein the joint is flexed.

FIG. 12 is an isometric view of an embodiment of a liquid lens with a joint portion 804, wherein the joint portion 804 is flexed. FIG. 2 shows the liquid lens when 0.002 MPa pressure is applied to the membrane portion 802, where pressure is applied to reflect an impact of fluid pressure in the liquid lens. The joint portion 804 rotates more near the edge 1008 than the corner 1004. Thus thinning the membrane 616 to make the joint portion 804 reduces beam effects while still allowing the liquid lens resist gravity and/or inertial effects.

Figure 13:
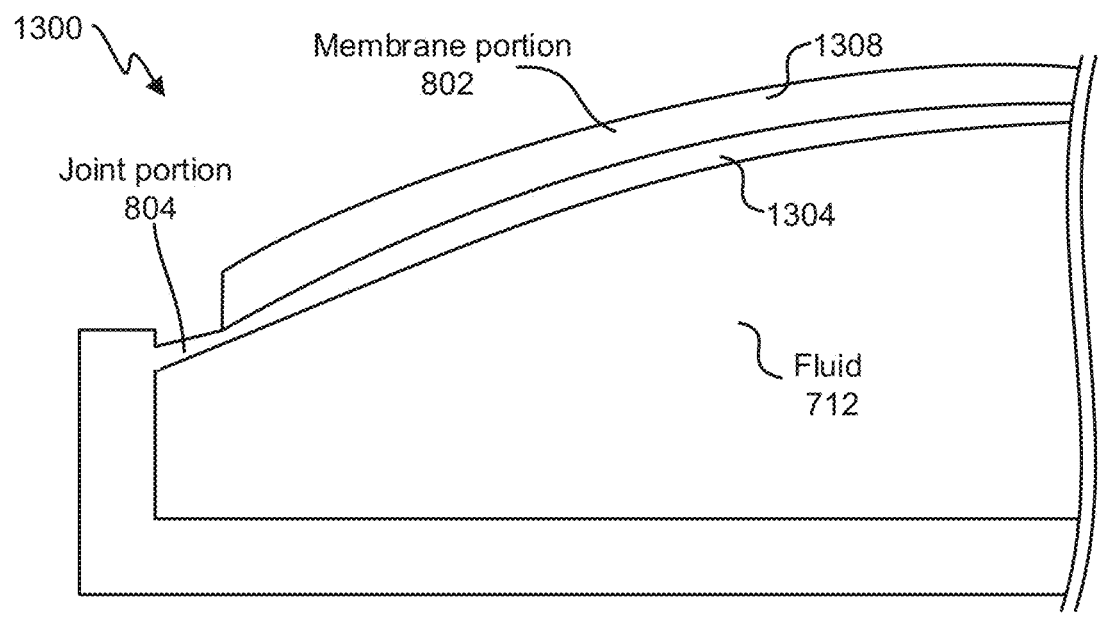
FIG. 13 illustrates a cross section of an embodiment of a liquid lens, wherein the joint is made of a different material than a membrane portion of the liquid lens.

FIG. 13 illustrates a cross section of an embodiment of a liquid lens 1300, wherein the joint portion 804 is made of a different material than a membrane portion 802. The joint portion 804 is made of a first material 1304. The membrane portion 802 is made of a second material 1308. The first material 1304 is not the same as the second material 1308. In some embodiments, the first material 1304 keeps the fluid 712 from contacting the membrane portion 802. In some embodiments, the joint portion 804 is opaque (not transparent) and/or does not extend completely underneath the membrane portion 802 (e.g., forms an aperture under the membrane portion 802).

Figure 14:
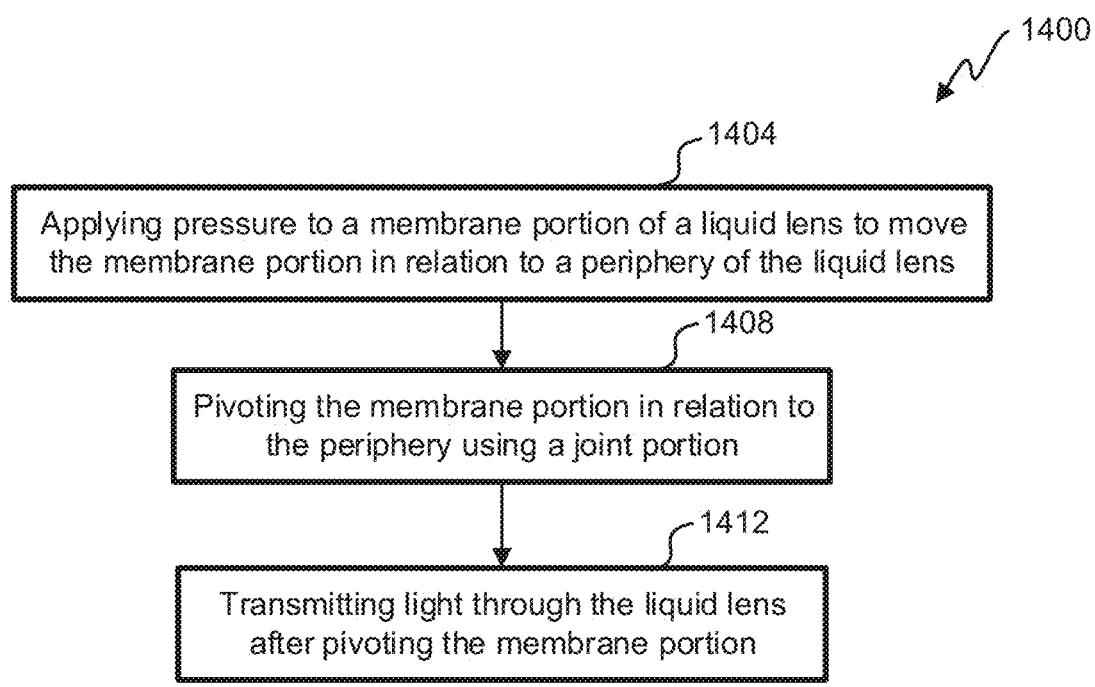
FIG. 14 illustrates an embodiment of a flowchart of a process for using a liquid lens.

FIG. 14 illustrates an embodiment of a flowchart of a process 1400 for using a liquid lens. Process 1400 begins in step 1404 with applying pressure to a membrane portion 802 of a liquid lens (e.g., using fluid 712) to move the membrane portion 802 in relation to a periphery 708 of the liquid lens. Pivoting the membrane portion 802 in relation to the periphery 708 using a joint portion 804, step 1408, is caused by the pressure applied to the membrane portion 802. In step 1412, light is transmitted through membrane portion 802 of the liquid lens after pivoting the membrane portion 802 in relation to the periphery 708, wherein beam effect is reduced compared to a liquid lens without a joint portion 804. In some embodiments, the method comprises transmitting light through the liquid lens before step 1404, wherein light transmitted through the liquid lens is focused differently in step 1412 than light transmitted through the liquid lens before step 1404. In some embodiments, the membrane portion 802 pivots less near a corner 1004 of the periphery 708 than at an edge 1008 of the periphery because a thickness of the joint portion 804 at the corner 1004 is greater than a thickness of the joint portion 804 at the edge 1008. In some embodiments, the method further comprises thinning the membrane 616 to form the joint portion 804 (e.g., before step 1404).

In some embodiments, the joint portion is made from a different polymer than the membrane portion, where the polymer making up the joint portion has a lower modulus than the polymer making up the membrane portion. The membrane portion may be coated with another material, including silicone, polyurethane, and/or natural rubber to increase the membrane portion flexural stiffness relative to the joint portion.

FIG. 15 illustrates a cross section of an embodiment of a jointed lens 1500. The jointed lens 1500 comprises a membrane portion 1502, a bottom plate 1504, a joint portion 1506, a periphery 1508, and fluid 1512. The periphery 1508 circumscribes the fluid 1512 to confine the fluid 1512 within a shape of the periphery 1508 (e.g., the periphery 1508 confines the fluid 1512 within the shape, wherein the shape is defined in an x/y plane). The membrane portion 1502, the joint portion 1506, and the periphery 1508 are part of a membrane 1516. The jointed lens 1500 comprises a driver plate 1520. The membrane 1516 is curved to attach to the bottom plate 1504. The bottom plate 1504 is considered a substrate in some embodiments. An upper portion 1528 of the membrane 1516 contacts and the driver plate 1520, and a lower portion 1524 of the membrane 1516 contacts the bottom plate 1504. The periphery 1508 is between the upper portion 1528 of the membrane 1516 and the lower portion 1524 of the membrane 1516. "Upper" and "lower" are used to distinguish portions of the membrane 1516 and do not necessarily indicate orientation of the jointed lens 1500. The joint portion 1506 is between the membrane portion 1502 and the upper portion 1528. A discontinuity 1532 distinguishes the membrane portion 1502 from the joint portion 1506. The joint portion 1506 is thinner than the membrane portion 1502. The joint portion 1506 couples the membrane portion 1502 with the periphery 1508 (e.g., in some embodiments, the upper portion 1528 and/or the lower portion 1524 are considered part of the periphery 1508; or the joint portion 1506 couples the membrane portion 1502 with the periphery 1508 via the upper portion 1528.

FIG. 16 illustrates the jointed lens 1500 with the driver plate 1520 and/or the bottom plate 1504 compressed. The driver plate 1520 is moved closer to the bottom plate 1504 than in FIG. 15. As the driver plate 1520 is driven toward the bottom plate 1504, the upper portion 1528 of the membrane 1516 is moved toward the lower portion 1524 of the membrane 1516, which pushes fluid 1512 away from the periphery 1508. Fluid 1512 moving away from the periphery 1508 exerts an increased force on the membrane portion 1502, which increases optical power of the jointed lens 1500. The joint portion 1506 is flexible and/or allows the membrane portion 1502 to move in the z direction and/or rotate with respect to the periphery 1508, which can help minimize the beam effect. In some embodiments, the joint portion 1506 is a portion of the membrane 1516 between the discontinuity 1532 and a portion of the membrane 1516 under and/or in contact with the driver plate 1520. The joint portion 1506 allows the membrane portion 1502 to move with respect to periphery 1508.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, and/or hardware.

Steps, operations, or processes described may be performed or implemented with one or more hardware or software modules, alone or in combination with other devices. In some embodiments, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations described. The apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A device for use as a liquid lens, the device comprising: a substrate; a membrane portion, wherein the membrane portion is flexible; a fluid filling a gap between the substrate and the membrane portion; a periphery confining the fluid within a shape of the periphery; and a joint portion, wherein: the joint portion couples the membrane portion with the periphery; the joint portion is configured to facilitate rotational movement of the membrane portion about the periphery as the liquid lens changes shape; and the joint portion has varying thickness, wherein thickness is measured in a direction parallel with an optical axis of the liquid lens, so that the membrane portion is configured to rotate less at a first location than at a second location.

2. The device of claim 1, wherein:
the membrane portion has an average thickness,
the joint portion has an average thickness, and
the average thickness of the joint portion is between 20% and 80% of the average thickness of the membrane portion.

3. The device of claim 1, wherein the joint portion follows the shape of the periphery.

4. The device of claim 1, wherein the membrane portion has a shape in a plane orthogonal to beam propagation that is non-elliptical.

5. The device of claim 1, wherein:
the joint portion is defined by a width, a length, and the thickness;
the width is a distance between the periphery and the membrane portion;
the length follows the shape of the periphery; and
the thickness is a minimum distance between a first side of the joint portion and a second side of the joint portion.

6. The device of claim 5, wherein the width of the joint portion is a constant.

7. The device of claim 1, wherein the shape of the periphery includes an edge and a corner.

8. The device of claim 7, wherein:
the edge of the periphery is defined by a first radius of curvature,
the corner of the periphery is defined by a second radius of curvature, and
the first radius of curvature is at least four times the second radius of curvature.

9. The device of claim 8, wherein a first thickness of the joint portion at the edge is less than a second thickness of the joint portion at the corner.

10. The device of claim 9, wherein the first thickness is between 10% and 60% of the second thickness.

11. The device of claim 1, wherein the joint portion is made of a different material than the membrane portion.

12. A method of using a liquid lens, the method comprising: applying pressure to a membrane portion of the liquid lens in relation to a periphery of the liquid lens, wherein the liquid lens comprises: a substrate; the membrane portion, wherein the membrane portion is flexible; a fluid filling a gap between the substrate and the membrane portion; the periphery confining the fluid within a shape of the periphery; and a joint portion, wherein: the joint portion couples the membrane portion with the periphery; the joint portion is configured to allow the membrane portion to move in relation to the periphery; and the joint portion has varying thickness, wherein thickness is measured in a direction parallel with an optical axis of the liquid lens, so that the membrane portion is configured to rotate less at a first location than at a second location; facilitating rotational movement of the membrane portion about the periphery as the liquid lens changes shape; and transmitting light through the liquid lens after facilitating rotational movement of the membrane portion, whereby beam effect is reduced compared to a liquid lens without a joint portion.

13. The method of claim 12, wherein:
the membrane portion has an average thickness,
the joint portion has an average thickness, and
the average thickness of the joint portion is between 20% and 80% of the average thickness of the membrane portion.

14. The method of claim 12, wherein the shape of the periphery is non-elliptical.

15. The method of claim 12, wherein the membrane portion pivots less near a corner of the periphery than at an edge of the periphery because the thickness of the joint portion at the corner is greater than the thickness of the joint portion at the edge.

16. The method of claim 12, further comprising thinning a membrane to form the joint portion.

17. The method of claim 16, further comprising thinning a first side of the membrane and thinning a second side of the membrane to form the joint portion.

18. A system comprising: a frame; a display mounted in the frame; a waveguide in the display; and a liquid lens configured to change focus of light exiting the waveguide, the liquid lens comprising: a substrate; a membrane portion, wherein the membrane portion is flexible; a fluid filling a gap between the substrate and the membrane portion; a periphery confining the fluid within a shape of the periphery; and a joint portion, wherein: the joint portion couples the membrane portion with the periphery; the joint portion is configured to facilitate rotational movement of the membrane portion about the periphery as the liquid lens changes shape; and the joint portion has varying thickness, wherein thickness is measured in a direction parallel with an optical axis of the liquid lens, so that the membrane portion is configured to rotate less at a first location than at a second location.

19. The system as recited in claim 18, wherein:
the liquid lens is a first liquid lens,
the system further comprises a second liquid lens, and
the second liquid lens is configured to counteract effects of the first liquid lens for an object imaged on an opposite side of the display in relation to a user's eye.

20. The system as recited in claim 18, wherein the joint portion consists of the same material as the membrane portion.

* * * * *